US007143353B2

(12) United States Patent
McGee et al.

(10) Patent No.: US 7,143,353 B2
(45) Date of Patent: Nov. 28, 2006

(54) STREAMING VIDEO BOOKMARKS

(75) Inventors: Thomas McGee, Garrison, NY (US); Lalitha Agnihotri, Fishkill, NY (US); Nevenka Dimitrova, Yorktown Hights, NY (US); Radu Jasinschi, Ossining, NY (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 653 days.

(21) Appl. No.: 09/822,447

(22) Filed: Mar. 30, 2001

(65) Prior Publication Data

US 2002/0163532 A1 Nov. 7, 2002

(51) Int. Cl.
  *G06F 3/00* (2006.01)
  *H04N 5/91* (2006.01)
(52) U.S. Cl. ............... 715/723; 715/719; 715/720; 715/721; 715/512; 725/41
(58) Field of Classification Search ............... 345/716, 345/719–721, 723, 733, 738, 764, 864; 715/500.1, 715/512, 716, 719–721, 723, 733, 738, 764, 715/864; 725/37, 41, 46
  See application file for complete search history.

(56) References Cited

U.S. PATENT DOCUMENTS

| 5,414,644 | A | * | 5/1995  | Seaman et al. ............ 702/183 |
| 5,414,808 | A | * | 5/1995  | Williams .................. 345/723 |
| 5,467,288 | A | * | 11/1995 | Fasciano et al. .......... 345/716 |
| 5,521,841 | A | * | 5/1996  | Arman et al. ............. 345/723 |
| 5,524,193 | A | * | 6/1996  | Covington et al. ........ 715/512 |
| 5,535,063 | A | * | 7/1996  | Lamming ................... 360/4  |
| 5,708,845 | A | * | 1/1998  | Wistendahl et al. ...... 715/500.1 |
| 5,973,723 | A | * | 10/1999 | DeLuca ..................... 725/34 |
| 6,119,154 | A | * | 9/2000  | Weaver et al. ............ 709/219 |
| 6,125,229 | A |   | 9/2000  | Dimitrova et al. .......... 386/69 |
| 6,137,544 | A |   | 10/2000 | Dimitrova et al. ......... 348/700 |
| 6,173,317 | B1| * | 1/2001  | Chaddha et al. .......... 709/219 |
| 6,212,328 | B1|   | 4/2001  | Nakamura ................. 386/83  |
| 6,219,837 | B1| * | 4/2001  | Yeo et al. ................. 725/38 |
| 6,285,361 | B1| * | 9/2001  | Brewer et al. ............ 345/723 |
| 6,289,346 | B1| * | 9/2001  | Milewski et al. .......... 707/10 |
| 6,295,055 | B1| * | 9/2001  | Miller et al. ............. 345/700 |
| 6,321,024 | B1| * | 11/2001 | Fujita et al. .............. 386/55 |
| 6,332,144 | B1| * | 12/2001 | deVries et al. ........... 707/102 |
| 6,332,147 | B1| * | 12/2001 | Moran et al. ............ 715/500.1 |
| 6,360,234 | B1| * | 3/2002  | Jain et al. ................ 715/500.1 |
| 6,400,378 | B1| * | 6/2002  | Snook ..................... 715/716 |
| 6,400,890 | B1| * | 6/2002  | Nagasaka et al. .......... 386/69 |

(Continued)

FOREIGN PATENT DOCUMENTS

EP    0820180 A2 *  1/1998

(Continued)

OTHER PUBLICATIONS

Jennifer J. Salopek, "Coolness is a state of mind", Nov. 1998, Training and Development, v. 52, No. 11, pp. 22-6+.*

(Continued)

*Primary Examiner*—Lucila X. Bautista

(57) ABSTRACT

A method, apparatus and systems for bookmarking an area of interest of stored video content is provided. As a viewer is watching a video and finds an area of interest, they can bookmark the particular segment of the video and then return to that segment with relative simplicity. This can be accomplished by pressing a button, clicking with a mouse or otherwise sending a signal to a device for marking a particular location of the video that is of interest. Frame identifiers can also be used to select a desired video from an index and to then retrieve the video from a medium containing multiple videos.

24 Claims, 6 Drawing Sheets

U.S. PATENT DOCUMENTS

| | | | |
|---|---|---|---|
| 6,404,978 B1* | 6/2002 | Abe | 386/55 |
| 6,429,879 B1* | 8/2002 | Sturgeon et al. | 345/723 |
| 6,449,653 B1* | 9/2002 | Klemets et al. | 709/231 |
| 6,452,615 B1* | 9/2002 | Chiu et al. | 345/776 |
| 6,529,920 B1* | 3/2003 | Arons et al. | 715/500.1 |
| 6,551,357 B1* | 4/2003 | Madduri | 715/512 |
| 6,580,437 B1* | 6/2003 | Liou et al. | 345/719 |
| 6,661,430 B1* | 12/2003 | Brewer et al. | 345/723 |
| 6,681,398 B1* | 1/2004 | Verna | 725/141 |
| 6,721,361 B1* | 4/2004 | Covell et al. | 375/240.14 |
| 6,754,389 B1* | 6/2004 | Dimitrova et al. | 382/224 |
| 6,882,793 B1* | 4/2005 | Fu et al. | 386/95 |
| 2001/0021268 A1* | 9/2001 | Jun et al. | 382/165 |
| 2001/0044808 A1* | 11/2001 | Milewski et al. | 707/204 |
| 2002/0007485 A1* | 1/2002 | Rodriguez et al. | 725/1 |
| 2002/0028026 A1* | 3/2002 | Chen et al. | 382/284 |
| 2002/0069218 A1* | 6/2002 | Sull et al. | 707/501.1 |
| 2002/0078446 A1* | 6/2002 | Dakss et al. | |
| 2002/0092019 A1* | 7/2002 | Marcus | 725/37 |
| 2003/0067554 A1* | 4/2003 | Klarfeld et al. | 348/461 |
| 2003/0177503 A1* | 9/2003 | Sull et al. | 725/112 |

FOREIGN PATENT DOCUMENTS

| | | | |
|---|---|---|---|
| EP | 1220479 A2 * | 7/2002 | |
| WO | 9962008 A1 | 12/1999 | |
| WO | 0058967 A1 | 10/2000 | |

OTHER PUBLICATIONS

"Exciting Events, Broad-based Seminars, Top Exhibitors and New Strategic Alliances Make DVD'98 Fall Conference & Exhibition a Must for the Multimedia Communications Industry", Sep. 1998, PRNewswire.*

Cynthia Morgan, "Digital lava erupts", Jul. 1999, ComputerWorld v.33 n.28 pp. 64.*

Jennifer J. Salopek, "Crank Up Your Coolness Quotient", (part 1 and 2), Nov. 1998, Training & Development, v. 52, n. 11, pp. 21-34.*

"I-Recall . . . Releases Souvenir And Souvenir Publisher, Streaming Media Bookmarking Software with Web Publishing And Email Capabilities", May 2000, PR Newswire.*

"I-Recall introduces Souvenir and Souvenir Publisher", www.i-recall.com, before Mar. 30, 2001.*

"TiVo", 1999, USByte Resources, pp. 1-3.*

Chuck Fuller, "Deploying Video on the Web", 1999, NewArchitect.com, pp. 1-8.*

Larry Bouthillier, "Delivering Streaming Media", 1999, NewArchitect.com, pp. 1-12.*

Li-Qun Xu et al, "Video summarization and semantics editing tools", Jan. 24, 2001,SPIE, Proceedings of SPIE-The International Society for Optical Engineering, v.4315, pp. 242-252.*

Steven Sweet, "Multimedia Files Organizing the Easy Way", Mar./Apr. 1994, Computer Pictures, ps-15(3).*

Will Tait, "Asymetrix Multimedia Toolbook 3.0", Jun. 1994, AV Video, v16, n6, ps9(1).*

John M. Gauch, et al, "Real time video scene detection and classification", May 1999, Information Processing and Management, vol. 35, No. 3, pp. 381-400.*

Tanaka Satoshi et al, "Development of Video Cataloging and Browsing Technology featuring Scene Structure Analysis", 199 Institute of Electronics, Information and Communication Engineers, vol. 99, No. 179, pp. 53-58.*

Junghwan Oh, "Efficient techniques for management and delivery of video data", Fall 2000, vol. 61/10-B of Dissertation Abstracts International, p. 5412 (117 pages).*

"Probabilistic Reasoning In Intelligent Systems: Networks of Plausible Inference", by Judea Pearl, pp. 116-131.

"Parsing TV Programs for Identification and Removal of Non-Story Segments", by T. McGee et al., pp. 243-251.

"PNRS—Personal News Retrieval System", by N. Dimitrova et al., SPIE vol. 3846, Sep. 1999.

"Test, Speech, and Vision for Video Segmentation: The Informedia TM Project", by A. Hauptmann et al.

"Video Keyframe Extraction and Filtering: A Keyframe is not a Keyframe to Everyone", by Dimitrova et al, pp. 113-120.

"Face Detection for Image Annotation" by G. Wei et al.

"Text Detection for Video Analysis", by L. Agnihotri et al, pp. 109-113.

"Motion Segmentation and Qualitative Dynamic Scene Analysis from an Image Sequence", by P. Bouthemy et al.

"Uniqueness and Estimation of Three-Dimensional Motion Parameters of Rigid Objects with Curved Surfaces", by Roger Tsai et al.

"Content-Based Classification, Search, and Retrieval of Audio", by E. Wold et al.

"Automatic Transcription of English Broadcast News", by P. Beyerlein et al.

"Audio Databases with Content-Based Retrieval", by T. Blum et al.

"Video Classification using Speaker Identification" by N. Patel et al.

"Towards Music Understanding without Separation: Segmenting Music with Correlogram Comodulation", by E. Scheirer.

* cited by examiner

STREAMING VIDEO BOOKMARKS

BACKGROUND OF THE INVENTION

The invention relates generally to accessing stored video content and more particularly to a method and apparatus for bookmarking video content for identifying meaningful segments of a video signal for convenient retrieval at a later time.

Users often obtain videos stored in VHS format, DVD, disks, files or otherwise for immediate viewing or for viewing at a later time. Frequently, the videos can be of great length and might have varied content. For example, a viewer might record several hours of content, including various television programs or personal activities on a single video cassette, hard drive or other storage medium. It is often difficult for viewers to return to particularly significant portions of a video. It is often inconvenient to record frame counter numbers or recording time information, particularly while viewing a video.

Users frequently use frustrating hit-or-miss methods for returning to segments of particular interest. For example, a viewer might record or obtain a video that includes performances of a large number of comedians or figure skaters, but only be interested in the performances of a relatively small number of these individuals. Also, a viewer might be recording the broadcast while watching the Superbowl or World Series, and wish to return to five or six memorable plays of the game.

Current methods for locating particular segments of interest have been inconvenient to use and accordingly, it is desirable to provide an improved apparatus and method for bookmarking a meaningful segment of a video.

SUMMARY OF THE INVENTION

Generally speaking, in accordance with the invention, a method, apparatus and systems for bookmarking an area of interest of stored video content is provided. As a viewer is watching a video and finds an area of interest, they can bookmark the particular segment of the video and then return to that segment with relative simplicity. This can be accomplished by pressing a button, clicking with a mouse or otherwise sending a signal to a device for marking a particular location of the video that is of interest. The boundaries of the entire segment can then be automatically identified using various superhistograms, frame signatures, cut detection methods, closed caption information, audio information, and so on, by analyzing the visual, audio and transcript portions of the video signal. The visual information can be analyzed for changes in color, edge and shape to determine change of individuals by face changes, key frames, video texts and the like. Various audio features such as silence, noise, speech, music, and combinations thereof can be analyzed to determine the beginning and ending of a segment. Closed captioning information can also be analyzed for words, categories and the like. By processing this information to determine the boundaries of a meaningful segment of the video, the bookmark will not merely correspond to a specific point of the video, but to an entire automatically created segment of the content.

Thus, not only can bookmark methods, systems and devices in accordance with the invention enable a user to conveniently return to a segment of a video of interest, the user can be brought to the beginning of the segment and can optionally only view the particular segment of interest, or scroll through or view only segments of interest in sequence.

For example, if a bookmark signal is sent while a particular speaker is speaking in a video of a situation comedy, identifying the current speaker when the bookmark signal is delivered can identify segment boundaries by determining when that speaker begins and stops speaking. This information can be useful for certain types of content, such as identifying a segment of a movie, but not for others. Histogram information such as change of color-palette signals can also help identify segment changes. Closed captions and natural language processing techniques can provide further information for delineating one topic from the next and will also help in identifying boundaries based on topics, dialogues and so forth. By selecting or combining evidence from the above segment identification techniques, the boundaries of the segment can be determined and established. The above can also be combined with analysis of the structure of the program as a whole to further identify the segments.

In one embodiment of the invention, the bookmark signal identifies a frame and the segment is based on time, such as 30 seconds or 1 minute, or video length such a s a selected number of frames, for example, before and after the selected frame. Alternatively, the segment can be set to a predefined length, such as 30 seconds or 1 minute from the segment beginning. Thus, if a bookmark signal is sent towards the end of a long segment, only the first part of the segment and possibly just the portion with the bookmark signal will be stored. Each segment can include EPG data, a frame or transcript information or combinations thereof. Indices of segments can be reviewed from remote locations, such as via the internet or world wide web and videos can be selected by searching through such an index.

In one embodiment of the invention, new scenes are detected on a running basis as a video is being watched. When a bookmark signal is activated, the system then looks for the end of the scene and records/indexes the bookmarked scene or stores the scene separately.

In one embodiment of the invention, when a user watching video activates the bookmark feature, the unique characteristics of the individual frame are recorded. Then, if a user has a large volume of video content in a storage medium and wants to return to a bookmarked scene or segment, but cannot remember the identity of the movie, television program or sporting event, the characteristics of the frame, as a unique or relatively unique identifier are searched and the scene (or entire work) can be retrieved. Thus, a viewer could scroll through a series of video bookmarks until the desired scene is located and go directly to the scene or to the beginning of the work. Users can even keep personal lists of favorite bookmarked segments of not only video, but music, audio and other stored content and can access content from various internet or web accessible content sources by transmitting the frame identifier or segment identifier to the content source.

Bookmarks in accordance with the invention can be backed up to a remote device, such as a PDA or other computerized storage device. Such a device can categorize the bookmarks, such as by analyzing EPG data, frame information, transcript information, such as by doing a key word search, or other video features. In fact, the systems and methods in accordance with the invintion can also be used to bookmark and categorize various types of electronic content, such as segments from audio books, music, radio programs, text documents, multimedia presentations, photographs or other images, and so on. It can also be advantageous to store bookmarks as different levels, so that certain privacy and/or parental guidance issues can be addressed. In certain embodiments of the invention, the bookmarks can be accessed through web pages, mobile communication devices, PDAs, watches and other electronic devices.

Thus, an individual can store EPG data, textual data or some other information as well as the bookmarks to give a richer prospective of the video. This textual information could be part or all of the transcript, the EPG data related to a synopsis or actor, a keyframe and so on. This information could be further used to characterize the segment and bookmark.

Accordingly, it is an object of the invention to provide an improved method, system and device for bookmarking and retrieving video and other content which overcomes drawbacks of existing methods, systems and devices.

BRIEF DESCRIPTION OF THE DRAWINGS

For a fuller description of the invention, reference is had to the following description, taken in connection with the accompanying drawings, in which.

DETAILED DESCRIPTION OF THE PREFERRED EMBODIMENTS

Often a viewer would like to bookmark a segment of the video they are watching for future retrieval. Bookmarking video can make it much easier to return to particular segments of interest. As a user watches a live video or video stored on a tape, disk, DVD, VHS tape or otherwise, they can press a button or otherwise cause a signal to be sent to a device electronically coupled to the video to enter a marking point. This marking point (or the signature of the frame) can be recorded in free areas of the tape (such as control areas) or medium on which the video is recorded or the time or frame count for the particular point of the tape can be recorded on a separate storage medium.

Figure 5:
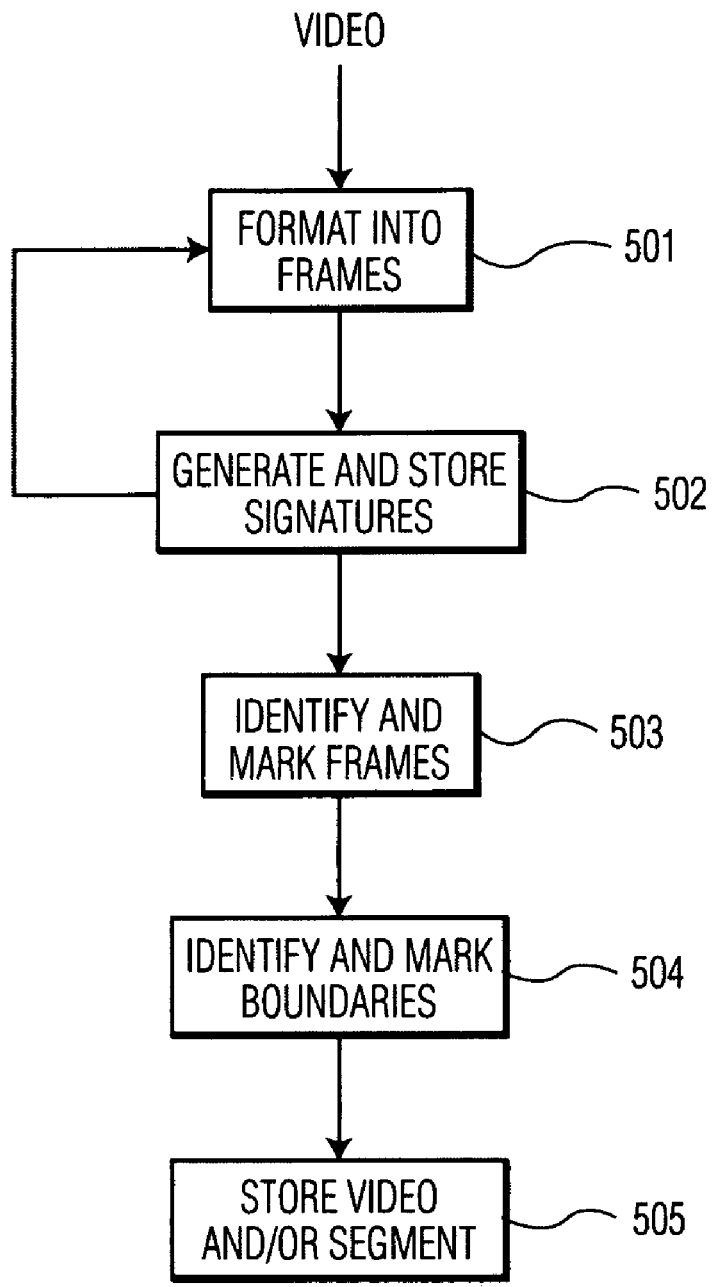
FIG. 5 shows the process flow for the incoming video.

FIG. 5 shows the process flow. The incoming video can be divided (formatted) into frames in step 501. Next for each of the frames, a signature is developed and stored in step 502. If the user has selected the frame for bookmarking then the frame is identified and the signature with its frame position and video information stored as a bookmark in step 503. The boundaries around the bookmark are then identified and their information can be stored as well in step 504. The segment identification, such as the segment boundaries or the video can be stored depending on the user in step 505.

In one embodiment of the invention, a user might store the bookmarks on a PDA, server or other storage device. This can act as a look up table. A user can also verify if they have viewed or obtained a specific video by comparing a bookmark or frame information to frame information of the video, stored, for example on an external server. A viewer might download video and then after viewing, delete the video, keeping only the bookmark(s) and then retrieve the video from an external source when additional viewing is desired. Thus, storage resources can be maximized and the efficiency of centralized content storage sources can be utilized.

In one embodiment of the invention, when a viewer clicks on a video, the frame being displayed at that time is extracted out for analysis. A signature, histogram, closed captioning or some other low-level feature or combination of features, could represent this frame. Examples will be provided below.

Although systems in accordance with the invention can be set up to return to the exact point where the bookmark signal is activated, in enhanced systems or applications a meaningful segment of the video can be bookmarked and users can have the option of returning to either the exact point or to the beginning of a meaningful segment, rather than to the middle of a segment or to the end of a segment, as a user might not decide to bookmark a segment until after it has been viewed and found to be of interest.

Identifying the segment to which a bookmark corresponds can be accomplished in various manners. For example, in a preferred embodiment of the invention, the entire video or large portions thereof can be analyzed in accordance with the invention and broken down into segments. Then, when a bookmark signal is activated, the segment which is occurring when the signal is activated (or the prior segment, or both) can be bookmarked. In another embodiment of the invention, the analysis to determine the boundaries of a segment are not conducted until after the bookmark signal is activated. This information (video signature, start and end time of the tape, frame count and so forth) can be stored in the same location identified above.

In still another embodiment of the invention, a method of identifying items of content such as videos, audio, images, text and combinations thereof, and the like can be performed by creating a bookmark comprising a selected segment of the content item having sufficient identifying information to identify the content item and retaining the segment identifying the item on a storage medium, such as a storage medium at a service provider. Users could then download the bookmarks at a remote location at their election. Users could then use the bookmarks to identify the original item of content from which the bookmark was created. These downloads of bookmarks can be created in accordance with personal profiles.

DCT Frame Signatures

When the viewer selects a frame, one type of frame signature can be derived from the composition of the DCT coefficients. A frame signature representation is derived for each grouping of similarly valued DCT blocks in a frame, i.e., a frame signature is derived from region signatures within the frame. Each region signature is derived from block signatures as explained in the section below. Qualitatively, the frame signatures contain information about the prominent regions in the video frames representing identifiable objects. The signature of this frame can than be used to retrieve this portion of the video.

Figure 3:
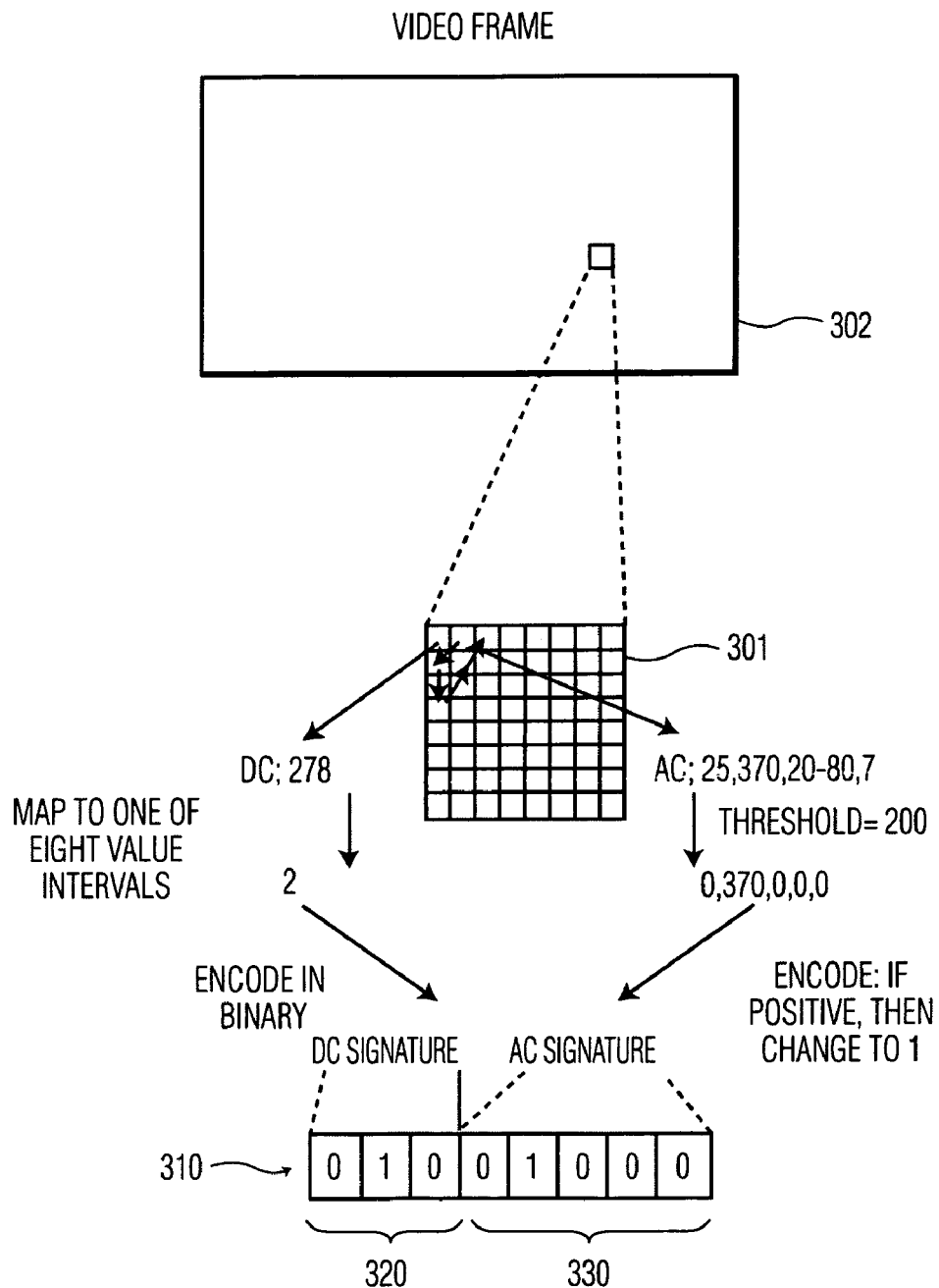
FIG. 3 is a schematic diagram showing the selection of frame information from a video image in accordance with embodiments of the invention.

Referring to FIG. 3, extracting block, region and frame signatures can be performed as follows. Based on the DC and highest values of the AC coefficients, a signature is derived for each block 301 in a video frame 302. Then, blocks 301 with similar signatures are compared and size and location of groups of blocks 301 are determined in order to derive region signatures.

The block signature 310 can be eight bits long, out of which three bits 320 are devoted to the DC signature and five bits 330 are devoted to the AC values. The DC part 320 of the signature 310 is derived by determining where the DC value falls within a specified range of values (e.g. −2400 to 2400). The range can be divided into a preselected number of intervals. In this case, eight intervals are used (eight values are represented by three bits). Depending on the type of application, the size of the whole signature can be changed to accommodate a larger number of intervals and therefore finer granularity representation. Each interval is assigned a predefined mapping from the range of DC values to the DC part 320 of the signature. Five bits 330 are used to represent the content of the AC values. Each AC value is compared to a threshold, e.g. 200 and if the value is greater than the threshold, the corresponding bit in the AC signature is set to one. An example is shown in FIG. 3, where only value 370 is greater than the threshold of 200.

As shown in FIG. 3, five bits are used to represent the content of the AC values. Each AC value is compared to a threshold, if the value is greater than the threshold, the corresponding bit in the AC signature is set to one.

After deriving block signatures for each frame, regions of similarly valued block signatures are determined. Regions consist of two or more blocks that share similar block signatures. In this process, a region growing method can be used for isolating regions in the image. Traditionally, region growing methods use pixel color and neighborhood concepts to detect regions. In one embodiment of the invention, block signature is used as a basis for growing regions. Each region can then be assigned a region signature, e.g.: regionSignature(mblockSignature, regionSize, Rx, Ry) where Rx and Ry are the coordinates of the center of the region. Each region corresponds roughly to an object in the image.

A selected frame can be represented by the most prominent groupings (regions) of DCT blocks. An n-word long signature is derived for a frame where n determines the number of important regions (defined by the application) and a word consists of a predetermined number of bytes. Each frame can be represented by a number of prominent regions. In one embodiment of the invention, the number of regions in the image is limited and only the largest regions are kept. Because one frame is represented by a number of regions, the similarity between frames can be regulated by choosing the number of regions that are similar, based on their block signature, size and location. The regions can be sorted by region size and then the top n region signatures can be selected as a representative of the frame:frame (regionSignature1, . . . regionSignaturen). It should be noted that this representation of keyframes is based on the visual appearance of the images, and does not attempt to describe any semantics of the images.

Frame Searching

To find the position in the video, a frame comparison procedure compares a bookmarked frame F″ with all frames F′ in a list of frames. Their respective region signatures are compared according to their size:

$$\text{frame\_difference} = \sum_{i=1}^{n} |\text{region\_size}'_i - \text{region\_size}''_i|$$

The frame difference can be calculated for the regions in the frame signature with the same centroids. In this case, the position of the objects as well as the signature value is taken into account. On the other hand, there are cases when the position is irrelevant and we need to compare just the region sizes and disregard the position of the regions.

If the frame difference is zero then we can use the position information from the matching frame to retrieve that section of the video.

Other Frame Signature Types

Signatures can be created by using combination of features from the frames, such as the maximum absolute difference (MAD) between the preceding and/or following frame. The intensity of the frame, bitrate used for the frame, whether the frame is interlaced or progressive; whether the frame is from a 16:9 or 4:3 format, and so forth. This type of information could be used in any combination to identify the frame and a retrieval process developed similar to that described above used.

Color Histograms

Instead of using the signatures described above, one could calculate a color histogram for the frame and use this for retrieval. The color histogram could consist of any number of bins.

Closed Captioning

Closed captioning data could also be used to bookmark the segment by extracting out the key words that represent the section.

Combinations

Any combination of the above could also be used to bookmark the frame or section.

Defining the segments

The segments could be manually bookmarked by the viewer by having the viewer click on the start and end points of the video. Alternatively, the bookmarking could happen automatically using a technique such as a superhistogram. Automatic techniques for determining the boundaries of a frame are discussed below. For example, a scene will often maintain a certain color palette. A change in scene usually entails a break in this color palette. While the video is playing automatic video analysis can be performed to extract the histograms. When the viewer clicks on the video the color histogram for that frame is compared to the previous captured frames to identify the start of the frame then the same comparisons can be done to find the end of the scene. Using this information it is now possible to store only the segment of interest for the viewer. This information can also be used for more meaningful retrieval of the full video. For instance, instead of going directly to the position of when the viewer clicked, one could actually go to the start of the scene that contains that frame.

EXAMPLE

The viewer is watching a video of the Wizard of Oz movie. The current view contains frames where Dorothy, the Tin Man, the Cowardly Lion and the Scarecrow go into the Emerald City from the poppy field. The viewer clicks on the video, e.g., when the Horse of a Different Color passes. In one embodiment of the invention, the frame/scene analysis has been continuous. The system can then extract the selected frame and generates both the DCT frame signature as well as the color histogram, for example. The analysis program searches through the previous stored frames until it finds one that does not belong to the same color palette. This denotes the start of the scene. The program has continued analyzing the video until it locates the end of the scene by virtue of another significant change in color palette. If the user had already decided to record the whole video, the start and end points are marked. In another embodiment of the invention, only the segment is stored. Meanwhile the program has been analyzing and storing the DCT frame information for the individual frames. Sometime later, if the viewer views the bookmarked frame and decides to retrieve the portion of the video, the DCT frame information is compared with the stored information until a match is found. Then the marked points around this frame are used to retrieve that portion of the video.

Segmenting the video can be performed using analysis techniques such as those discussed in U.S. Pat. Nos. 6,137,544 and 6,125,229, the contents of which are incorporated herein by reference.

Segmenting a video signal can also be accomplished with use of a layered probabilistic system which can be referred to as a Bayesian Engine or BE. Such a system is described in J. Pearl, "Probabilistic Reasoning in Intelligent Systems: Networks of Plausible Inference," Morgan Kaufmann Publishers, Inc. San Mateo, Calif. (1988). Such a system can be understood with reference to FIG. 9.

Figure 4:
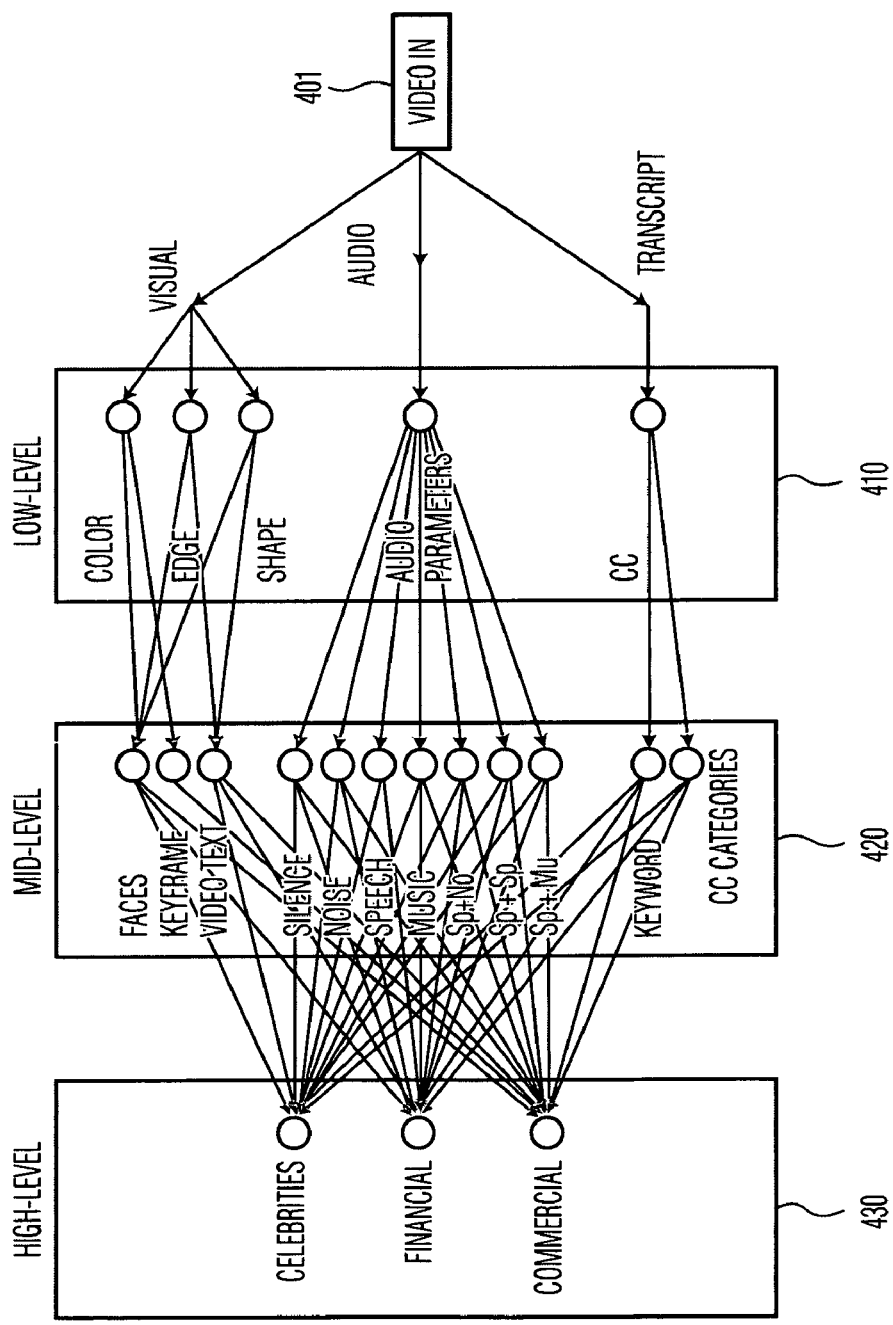
FIG. 4 is a chart showing three levels of a segmentation analysis in accordance with embodiments of the invention.

FIG. 4 shows a three layer probabilistic framework in three layers: low level 410, mid-level 420 and high level 430. Low level layer 410 describes signal processing parameters for a video signal 401. These can include visual features such as color, edge, and shape, audio parameters, such as average energy, bandwidth, pitch, mel-frequency cepstral coefficients, linear prediction coding coefficients, and zero-crossings; and the transcript, which can be pulled from the ASCII characters of the closed captions. If closed caption information is not available, voice recognition methods can be used to convert the audio to transcript characters.

The arrows indicate the combinations of low-level 410 features that create mid-level 420 features. Mid-level 420 features are associated with whole frames or collections of frames, while low level 410 features are associated with pixels or short time intervals. Keyframes (first frame of a shot), faces, and video text are mid-level visual features. Silence, noise, speech, music and combinations thereof are mid-level 420 features. Keywords and the closed caption/transcript categories also are part of mid-level 420.

High level features can describe semantic video content obtained through the integration of mid-level 420 features across the different modalities.

This approach is highly suitable because probabilistic frameworks are designed to deal with uncertain information, and they are appropriate for representing the integration of information. The BE's probabilistic integration employs either intra or inter-modalities. Intra-modality integration refers to integration of features within a single domain. For example: integration of color, edge, and shape information for videotext represents intra-modality integration because it all takes place in the visual domain. Integration of mid-level audio categories with the visual categories face and videotext offers an example of inter-modalities.

Bayesian networks are directed acyclical graphs (DAG) in which the nodes correspond to (stochastic) variables. The arcs describe a direct causal relationship between the linked variables. The strength of these links is given by conditional probability distributions (cpds). More formally, let the set $\Omega\{x_1, \ldots x_N\}$ of N variables define a DAG. For each variable $x_i$, i+1, ..., N, there exists a sub-set of variables of $\Omega$, $\Pi_{xi}$, the parents set of $x_i$ i.e., the predecessors of $x_i$, in the DAG, such that $P(x_i|\Pi_{xi})=P(x_i|x_1, \ldots, x_{i-1})$, where $P(\bullet|\bullet)$ is a cpd, strictly positive. Now, given the joint probability density function (pdf) $P(x_1, \ldots x_N)$, using the chain rule: $P(x_1, \ldots x_N)=P(x_N|x_{N-1}, \ldots, x_1) \times \ldots xP(x_2|x_1) \times P(x_1)$. According to this equation, the parent set $\Pi_{xi}$ has the property that $x_i$ and $\{x_1, \ldots, x_N\}\backslash\Pi_{xi}$ are conditionally independent given $\Pi_{xi}$.

In FIG. 4, the flow diagram of the BE has the structure of a DAG made up of three layers. In each layer, each element corresponds to a node in the DAG. The directed arcs join one node in a given layer with one or more nodes of the preceding layer. Two sets of arcs join the elements of the three layers. For a given layer and for a given element we compute a joint pdf as previously described. More precisely, for an element (node) $i^{(l)}$ associated with the l-th layer, the joint pdf is:

$$P^{(l)}(x^{(l)}_{i(l)}, \Pi^{(l-1)}, \ldots, \Pi^{(2)})=P(x^{(l)}_{i(l)}|\Pi^{(1)}) \times \{P(x^{(l-1)}_1|\Pi^{(l-1)}_1) \ldots P(x^{(l-1)}_{N(l-1)}|\Pi^{(l-1)}_{N(l-1)})\} \ldots \times \{P(x^2_1\Pi^2_l) \ldots P(x^2_{N2}|\Pi^{(2)}_{N2})\}, \quad (1)$$

where for each element $x_i^{(1)}$ there exists a parent set $\Pi_i^{(1)}$, the union of the parent sets for a given level l, i.e., $\Pi^{(1)} \equiv \Sigma_{i=1}^{N(l)}\Pi_i^{(l)}$. There can exist an overlap between the different parent sets for each level.

Topic segmentation (and classification) performed by BE is shown in the third layer (high-level) of FIG. 4. The complex nature of multimedia content requires integration across multiple domains. It is preferred to use the comprehensive set of data from the audio, visual, and transcript domains.

In the BE structure, FIG. 4, for each of the three layers, each node and arrow is associated to a cpd. In the low-level layer the cpd's are assigned by the AE as described above. For the mid-level layer, twenty closed captions categories (for example) are generated: weather, international, crime, sports, movie, fashion, tech stock, music, automobile, war, economy, energy, stock, violence, financial, national (affairs), biotech, disaster, art, and politics. It is advantageous to use a knowledge tree for each category made up of an association table of keywords and categories. After a statistical processing, the system performs categorization using category vote histograms. If a word in the closed captions file matches a knowledge base keyword, then the corresponding category gets a vote. The probability, for each category, is given by the ratio between the total number of votes per keyword and the total number of votes for a closed captions paragraph.

Systems in accordance with the invention can perform segmentation segmenting the TV program into commercial vs. non-commercial parts; classifying the non-commercial parts into segments based on two high-level categories: financial news and talk shows, for example (performed by the BE).

Initial segmentation can be done using closed caption data to divide the video into program and commercial segments. Next the closed captions of the program segments are analyzed for single, double, and triple arrows. Double arrows indicate a speaker change. The system marks text between successive double arrows with a start and end time in order to use it as an atomic closed captions unit. Systems in accordance with the invention can use these units as the segmenting building blocks. In order to determine a segment's high-level indexing (whether it is financial news or a talk show, for example) Scout computes two joint probabilities. These are defined as:

$$p\text{-FIN-TOPIC}=p\text{-}VTEXT*p\text{-}KWORDS*p\text{-FACE}*p\text{-AUDIO-FIN}*p\text{-}CC\text{-FIN}*p\text{-FACETEXT-FIN} \quad (2),$$

$$p\text{-TALK-TOPIC}=p\text{-}VTEXT*p\text{-}KWORDS*p\text{-FACE}*p\text{-AUDIO-TALK}*p\text{-}CC\text{-TALK}*p\text{-FACETEXT-TALK} \quad (3).$$

The audio probabilities p-AUDIO-FIN for financial news and p-AUDIO-TALK for talk shows are created by the combination of different individual audio category probabilities. The closed captions probabilities p-CC-FIN for financial news and p-CC-TALK for talk shows are chosen as the largest probability out of the list of twenty probabilities.

The face and videotext probabilities p-FACETEXT-FIN and p-FACETEXT-TALK are obtained by com-paring the face and videotext probabilities p-FACE and p-TEXT which determine, for each individual closed caption unit, the probability of face and text occurrence. One heuristic use builds on the fact that talk shows are dominated by faces while financial news has both faces and text. The high-level segmenting is done on each closed captions unit by computing in a new pair of probabilities: p-FIN-TOPIC and p-TALK-TOPIC. The highest value dictates the classification of the segment as either financial news or talk show.

A video signal can be pre-processed to extract other useful information which can be used to identify the boundaries of a segment. For example, The signal can be divided into audio, visual an transcript domains in order to generate semantically indexed information from video segments. The content of the domains can be analyzed and the analysis combined to more accurately identify the boundaries of a segment.

Video pre-processing can be accomplished with an Analysis Engine (AE) which can also combine video pre-processing with analysis. The AE can take MPEG-2 input, for example, and extract closed caption (cc) information. It can also perform audio and visual analysis, as discussed below for additional feature extraction. This information is then combined to identify segment boundaries.

One preferred AE is a Philips brand TriMedia™ Triodec card. The card has a TM 1000 processor and has 8 Mb of memory. It can be run using the hosted mode in a 600 MHz PIII computer with a WinNT operating system. "C" code can be downloaded to the TriMedia where analysis is performed.

The AE can perform shot detection first by extracting a new keyframe when it detects a significant difference between sequential I-frames (intermediate frames) of a group of pictures (GOP). It can employ two DCT based implementations for the frame differencing" histogram and macroblock. Unicolor keyframes or frames that appear similar to previously extracted keyframes can be filtered out using a one-byte frame signature. This keyframe extraction produces an uncompressed image and a list giving the keyframe number and the probability of a cut. The AE can base this probability on the relative amount above the threshold using the differences between the sequential I-frames. The system can then pass keyframes on for videotext detection. The AE can look for videotext using and edge-based method on the uncompressed image and can tag each keyframe for the presence or absence of text. These keyframes can be analyzed for the presence of faces.

The extraction process can produce a complete time-stamped program transcript. The time stamps can be used in order to align the transcript data with the related video.

Multiple, e.g. 20 low-level audio parameters can be extracted from the audio portion of the video signal and used for analysis in the segmenting process. This can be accomplished using, for example, .wav files on a PC. The outputs of the video pre-processing can then be used in the segmenting process.

Additional methods and systems for segmentation of the video signal are set forth below and in "Parsing TV Programs For Identification and Removal of Non-Story Segments", by T. McGee and N. Dimitrova, Proc. of SPIE Conf. on Storage and Retrieval for Image and Video Databases, pp. 243–251, San Jose, Calif., January, 1999; "PNRS-Personal News Retrieval System", by N. Dimitrova, H. Elenbaas and T. McGee, SPIE Conference on Multimedia Storage and Archiving Systems IV, pp. 2–10, September 1999, Boston; and "Text, Speech, and Vision For Video Segmentation: The Infomedia Project" by A. Hauptmann and M. Smith, AAAI Fall 1995 Symposium on Computational Models for Integrating Language and Vision 1995, the entire disclosures of which are incorporated herein by reference.

The following techniques can also be used to obtain information useful for identifying segment boundaries:

Cut detection: wherein two consecutive video frames are compared to identify abrupt scene changes (hard cuts) or soft transitions (dissolve, fade-in and fade-out). An explanation of cut detection is provided in the publication by N. Dimitrova, T. McGee, H. Elenbaas, entitled "Video Keyframe Extraction and Filtering: A Keyframe is Not a Keyframe to Everyone", Proc. ACM Conf. on Knowledge and Information Management, pp. 113–120, 1997, the entire disclosure of which is incorporated herein by reference.

Face detection: wherein regions of the video frames are identified which contain skin-tone and which correspond to oval-like shapes. An explanation of face detection is provided in the publication by Gang Wei and Ishwar K. Sethi, entitled "Face Detection for Image Annotation", Pattern Recognition Letters, Vol. 20, No. 11, November 1999, the entire disclosure of which is incorporated herein by reference.

Text detection: wherein text which appears in the video frame such as overlayed or superimposed text is identified. An explanation of text detection is provided in the article entitled "Text Detection in Video Segments" by L. Agnihotri and N. Dimitrova, Proceedings of IEEE Workshop on CBAIVL, Fort Collins, Colo., June 1999, held in conjunction with IEEE Conference on Computer Vision and Pattern Recognition 1999, the entire disclosure of which is incorporated herein by reference. In one preferred embodiment of the invention, once the text is detected, optical character recognition (OCR) which is known in the art is employed.

Motion Estimation/Segmentation/Detection: wherein moving objects are determined in video sequences and the trajectory of the moving object is analyzed. In order to determine the movement of objects in video sequences, known operations such as optical flow estimation, motion compensation and motion segmentation are preferably employed. An explanation of motion estimation/segmentation/detection is provided in the publication by Patrick Bouthemy and Francois Edouard, entitled "Motion Segmentation and Qualitative Dynamic Scene Analysis from an Image Sequence", International Journal of Computer Vision, Vol. 10, No. 2, pp. 157–182, April 1993, the entire disclosure of which is incorporated herein by reference.

Camera Motion: wherein a set of five (5) global camera parameters are employed, preferably two (2) translational and three (3) rotational. The 3-D camera motion is then classified as pure tracking (horizontal motion), booming (vertical motion), dollying (motion in depth), panning (rotation about the vertical global axis), tilting (rotation about the horizontal axis), and rolling (rotation about the z-axis) or combinations of these motions. This information can be used to classify the video shots into, for example, "static", "zoom" and/or "span", and to further determine the director's intention for producing the shot. An explanation of camera motion detection is provided in the publication by R. Y. Tsai and T. S. Huang entitled "Uniqueness and Estimation of Three-Dimensional Motion Parameters of Rigid Objects with Curved Surfaces", IEEE Transaction on PAMI, Vol. 6, number 1, pp. 13–27, 1994, the entire disclosure of which is incorporated herein by reference.

Audio segmentation includes the following types of analysis of television programs: speech-to-text conversion, audio effects and event detection, speaker identification, program identification, music classification, and dialog detection based on speaker identification. Audio segmentation can include division of the audio signal into speech and non-speech portions. The first step in audio segmentation can involve segment classification using low-level audio features such as bandwidth, energy and pitch. Thereafter channel separation is employed to separate simultaneously occurring audio components from each other (such as music and speech) such that each can be independently analyzed.

Thereafter, the audio portion of the television program is processed in different ways such as speech-to-text conversion, audio effects and events detection, and speaker identification. Audio segmentation is known in the art and is generally explained in the publication by E. Wold and T. Blum entitled "Content-Based Classification, Search, and Retrieval of Audio", IEEE Multimedia, pp. 27–36, Fall 1996, the entire disclosure of which is incorporated herein by reference.

Speech-to-text conversion (known in the art, see for example, the publication by P. Beyerlein, X. Aubert, R. Haeb-Umbach, D. Klakow, M. Ulrich, A. Wendemuth and P. Wilcox, entitled "Automatic Transcription of English Broadcast News", DARPA Broadcast News Transcription and Understanding Workshop, Va., Feb. 8–11, 1998, the entire disclosure of which is incorporated herein by reference) can be employed once the speech segments of the audio portion of the television signal are identified or isolated from background noise or music. Speech-to-text conversion is important if closed-captioning is not available to provide a transcript of the audio portion of the television program.

Audio effects can be used for detecting events (known in the art, see for example the publication by T. Blum, D. Keislar, J. Wheaton, and E. Wold, entitled "Audio Databases with Content-Based Retrieval", Intelligent Multimedia Information Retrieval, AAAI Press, Menlo Park, Calif., pp. 113–135, 1997, the entire disclosure of which is incorporated herein by reference). Events can be detected by identifying the sounds that may be associated with specific events. For example, an announcer shouting "goal" in a sporting event could be detected as an important part of identifying a segment Speaker identification (known in the art, see for example, the publication by Nilesh V. Patel and Ishwar K. Sethi, entitled "Video Classification Using Speaker Identification", IS&T SPIE Proceedings: Storage and Retrieval for Image and Video Databases V, pp. 218–225, San Jose, Calif., February 1997, the entire disclosure of which is incorporated herein by reference) involves analyzing the voice signature of speech present in the audio signal to determine the identity of the person speaking. Speaker identification can be used, for example, to determine when the speaker changes, to help identify a segment boundary.

Program identification involves analyzing the audio portion of the audio/data/visual signal to identify a television program. This is especially useful in developing segment boundaries, as criteria for determining these boundaries can be set to vary depending on the type of program.

Music classification involves analyzing the non-speech portion of the audio signal to determine the type of music (classical, rock, jazz, etc.) present. This is accomplished by analyzing, for example, the frequency, pitch, timbre, sound and melody of the non-speech portion of the audio signal and comparing the results of the analysis with known characteristics of specific types of music. Music classification is known in the art and explained generally in the publication entitled "Towards Music Understanding Without Separation: Segmenting Music With Correlogram Comodulation" by Eric D. Scheirer, 1999 IEEE Workshop on Applications of Signal Processing to Audio and Acoustics, New Paltz, N.Y. Oct. 17–20, 1999.

After segmentation of the audio and video signals, various portions of the segmented audio and video signals can be combined (integrated).

The following nonlimiting example can be used to create an index of segments. The segment can then be selected when a user activates a bookmark signal within one of these segments when viewing a pre-existing tape (or file, DVD, disks, etc., referred to generally as tapes) or while recording on a new tape. The segments can be pre-established or established while the video is viewed. The beginning of a scene can be identified and if the bookmark activation signal is activated, the end of the scene can be identified and the scene (segment) indexed. The beginning of a tape, for example, can be used to store the index. Alternatively, the identification of segments can be stored in an associated file. For the present example, thirty seconds of "blank" or overwritable tape is desired. For a file, the selected area for the visual index may occur anywhere in the file, and may be reserved by a system automatically or manually selected by a user. The index may include visual images, audio, text or any combination thereof. For the present example, visual images and text are provided.

During an archival process, video content is analyzed during a video analysis process and a visual index is created. In a video analysis process, automatic significant scene detection and keyframe selection occur. Significant scene detection can be a process of identifying scene changes, i.e., "cuts" (video cut detection or segmentation detection) and identifying static scenes (static scene detection). For each scene, a particular representative frame called a keyframe is extracted. A keyframe filtering and selection process is applied to each keyframe of source video, such as a video tape, to create a visual index from selectively chosen key frames. Reference is to a source tape although clearly, the source video may be from a file, disk, DVD, other storage means or directly from a transmission source (e.g., while recording a home video).

In video tape indexing, an index is generally stored on the source tape. In video indexing an MPEG 1, MPEG 2, MPEG 4, Motion JPEG file or any other video file from a Video CD, DVD, or other storage device, or from a broadcast stream, the index may be stored on a hard disk, or other storage medium.

Figure 1:
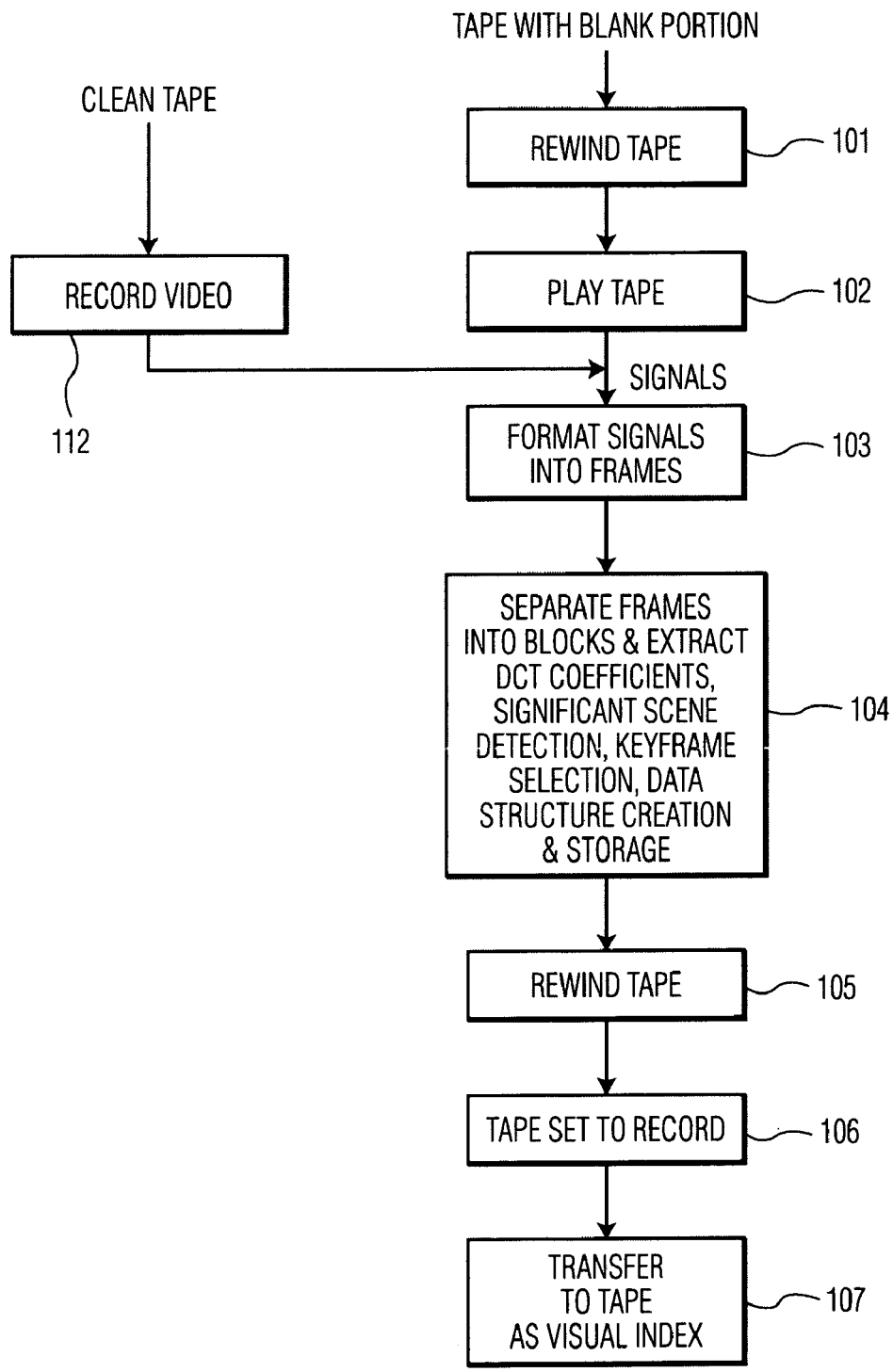
FIG. 1 illustrates a video analysis process for segmenting video content in accordance with embodiments of the invention.

A video archival process is shown in FIG. 1 for a source tape with previously recorded source video, which may include audio and/or text, although a similar process may be followed for other storage devices with previously saved visual information, such as an MPEG file. In this process, a visual index is created based on the source video. A second process, for a source tape on which a user intends to record, creates a visual index simultaneously with the recording.

FIG. 1 illustrates an example of the first process (for previously recorded source tape) for a video tape. In step 101, the source video is rewound, if required, by a playback/recording device such as a VCR. In step 102, the source video is played back. Signals from the source video are received by a television, a VCR or other processing device. In step 103, a media processor in the processing device or an external processor, receives the video signals and formats the video signals into frames representing pixel data (frame grabbing).

In step 104, a host processor separates each frame into blocks, and transforms the blocks and their associated data to create DCT (discrete cosine transform) coefficients; performs significant scene detection and keyframe selection; and builds and stores keyframes as a data structure in a memory, disk or other storage medium. In step 105, the source tape is rewound to its beginning and in step 106, the source tape is set to record information. In step 107, the signature is transferred from the memory to the source tape, creating the visual index. The tape may then be rewound to view the visual index.

The above process is slightly altered when a user wishes to create a visual index on a tape while recording. Instead of steps 101 and 102, as shown in step 112 of FIG. 1, the frame grabbing process of step 103 occurs as the video (film, etc.) is being recorded.

Additionally, if the tape, or file, is not completely recorded on at one time, a partially created video index could be saved on the tape, file, etc. or could be saved in a tape memory for later additions.

Figure 2A:
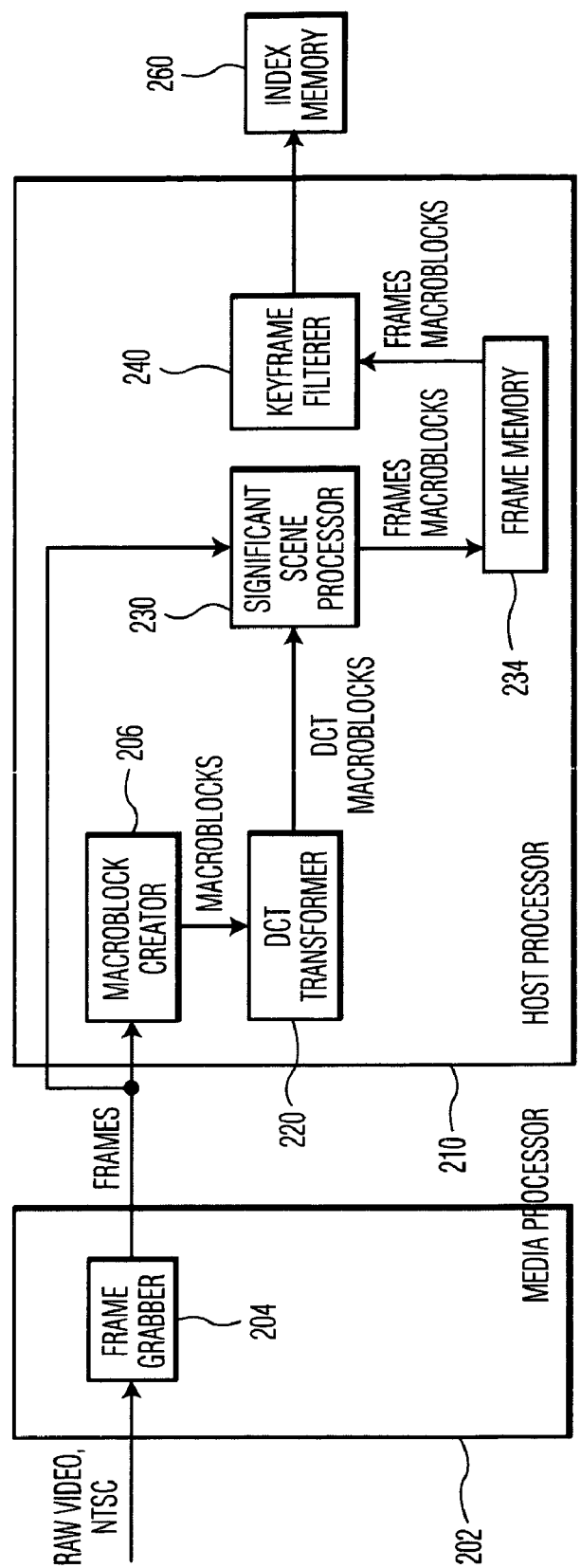
FIGS. 2A and 2B are block diagrams of devices used in creating a visual index of segments in accordance with embodiments of the invention.
Figure 2B:
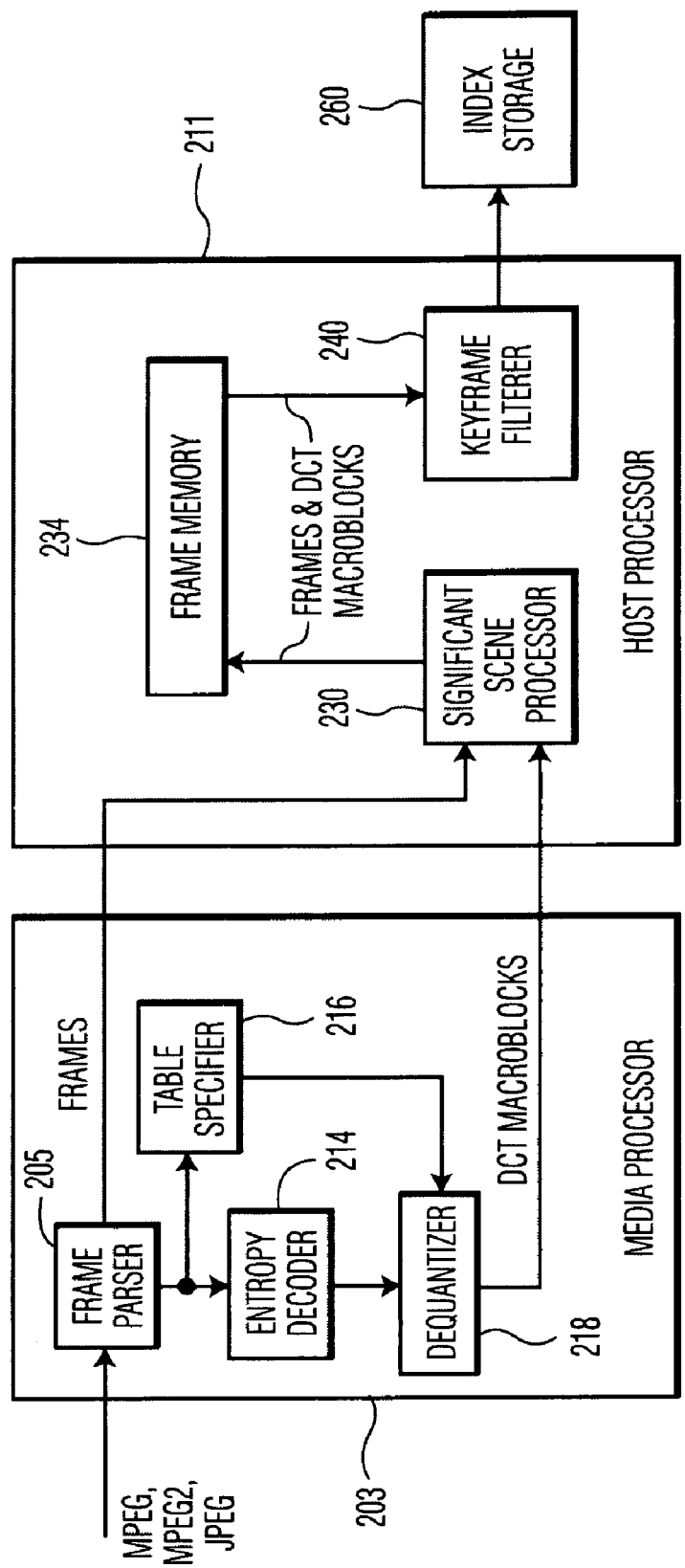

Steps 103 and 104 are more specifically illustrated in FIGS. 2A and 2B. Video can be present either in analog (continuous data) or digital (discrete data) form. The present example operates in the digital domain and thus uses digital form for processing and an analog to digital converter can be included. The source video or video signal is thus a series of individual images or video frames displayed at a rate high enough (in this example 30 frames per second) so the displayed sequence of images appears as a continuous picture stream. These video frames may be uncompressed (NTSC or raw video) or compressed data in a format such as MPEG, MPEG 2, MPEG 4, Motion JPEG or such.

The information in an uncompressed video is first segmented into frames in a media processor 202, using a frame grabbing technique such as is present on the Intel.RTM. Smart Video Recorder III. Although other frame sizes are available, in this example a frame represents one television, video, or other visual image and includes 352×240 pixels.

The frames can be each broken into blocks of, in this example, 8×8 pixels in the host processor 210 (FIG. 2A). Using these blocks and a popular broadcast standard, CCIR-601, a macroblock creator 206 (FIG. 2A) can create luminance blocks and can average color information to create chrominance blocks. The luminance and chrominance blocks form a macroblock. In one example, 4:2:0 can be used although other formats such as 4:1:1 and 4:2:2 could easily be used by one skilled in the art. In 4:2:0, a macroblock has six blocks, four luminance, Y1, Y2, Y3, and Y4; and two chrominance Cr and Cb, each block within a macroblock being 8×8 pixels.

The video signal may also represent a compressed image using a compression standard such as Motion JPEG (Joint Photographic Experts Group) and MPEG (Motion Pictures Experts Group). If the signal is instead an MPEG or other compressed signal, as shown in FIG. 2B the MPEG signal is broken into frames using a frame or bitstream parsing technique by a frame parser 205. The frames are then sent to an entropy decoder 214 in the media processor 203 and to a table specifier 216. The entropy decoder 214 decodes the MPEG signal using data from the table specifier 216, using, for example, Huffman decoding, or another decoding technique.

The decoded signal is next supplied to a dequantizer 218 which dequantizes the decoded signal using data from the table specifier 216. Although shown as occurring in the media processor 203, these steps (steps 214–218) may occur in either the media processor 203, host processor 211 or even another external device depending upon the devices used.

The present method can use comparisons of DCT (Discrete Cosine Transform) coefficients. First, each received frame is processed individually in the host processor 210 to create macroblocks. Host processor 210 processes each macroblock which contains spatial information, using a discrete cosine transformer 220 to extract DCT coefficients and create e.g., the six 8×8 blocks of DCT coefficients. The host processor 210 further processes each of the macroblocks using the significant scene processor 230. A keyframe filtering method can be used in the present invention to reduce the number of keyframes saved in frame memory 234 by filtering out repetitive frames and other selected types of frames. Keyframe filtering can be performed by a keyframe filterer 240 in the host processor 210 after significant scene detection. The information is then output to an index memory 260.

Alternatively, if a system has encoding capability (in the media processor, for example) that allows access at different stages of the processing, the DCT coefficients could be delivered directly to the host processor. In all these approaches, processing may be performed in up to real time.

In step 104 of FIG. 1, the host processor 210, 1 which may be, for example, an Intel® Pentium® chip or other multiprocessor, a Philips®. Trimedia™ chip or any other multimedia processor; a computer; an enhanced VCR, record/playback device, or television; or any other processor, performs significant scene detection, key frame selection, and building and storing a data structure in an index memory, such as, for example, a hard disk, file, tape, DVD, or other storage medium.

Video Retrieval

Once a video tape or file has a visual index, a user may wish to access the visual index. A video retrieval process displays the visual index to the user in a useable form. The user can browse and navigate through the visual index and fast forward to a selected point on the source tape or the MPEG file.

The source video is rewound by, for example, a VCR or playback device, if required, to the location of the visual index, in one example, at the beginning of the tape. If the source video is on an MPEG file or disk, a pointer could point to the beginning of the storage location and would not need to be rewound. Similarly, other storage means could be properly set to the beginning of the visual index.

The visual index can be read by a VCR head, a computer, or other hardware device from the source video and saved into an index memory which can be any type of storage device, even a pda, palmtop computer, cell phone or other wireless storage device. A processor in, for example, the VCR can retrieve keyframes from an index memory of the source video. The retrieved keyframes can be processed to reduce size to, for example, 120×80 pixels, although other frame sizes may easily be chosen automatically or manually by a user.

The processed frames are next transferred to the host processor which writes the processed keyframes to display memory and displays them in a user interface such as a computer display, television screen, etc.

The source video can be stopped once the video index has been read. A video indexing system or software allows keyframes to be displayed on a display, such as a computer monitor or television screen. The visual index may be printed if the user desires. A user may also select a particular keyframe from the visual index. If a user wishes to view the source video at that particular keyframe, the source medium could then be automatically forwarded to a corresponding point where the keyframe was extracted and the source could thus be played. Alternatively, a counter could be displayed allowing a user to either fast forward through the source video or play the source video from the visual index to the selected key frame.

An additional feature of the invention would allow a user to stop the playing of a video tape at any point and access the visual index for that video tape. This could require a memory or buffer for storing the visual index when a video tape is first used during a session.

The present invention is shown using DCT coefficients; however, one may instead use representative values such as wavelength coefficients or a function which operates on a sub-area of the image to give representative values for that sub-area. This may be used in significant scene detection as well as keyframe filtering.

While the invention has been described in connection with preferred embodiments, it will be understood that modifications thereof within the principles outlined above will be evident to those skilled in the art and thus, the invention is not limited to the preferred embodiments but is intended to encompass such modifications.

The present invention can use and adapt existing techniques such as video segmentation, video parsing, speech recognition, character recognition, and object spotting, for finding cues in the video streams to provide a segment to be bookmarked as a user watches a video. Alternatively, a video can be pre bookmarked and a user can jump from desired segment to desired segment.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention defined by the appended claims.

What is claimed is:

1. A method of making segments of a video, comprising the steps of:
   providing video content that includes a series of video frames and reviewing the video;
   sending a bookmark signal during review of the video to select a selected frame being displayed when the bookmark signal is sent;
   identifying a characteristic feature of the selected frame and recording information corresponding to said selected frame on a storage medium; and
   in response to said sending the bookmark signal, processing the video to define a segment of the video containing the selected frame by identifying segment starting point and segment endpoint boundaries, and storing at least a portion of the segment,
   wherein the starting point and endpoint of the segment are based on detecting changes of information in the audio, visual or transcript portion of the video with respect to the frame recorded information, in frames prior to and subsequent to the selected frame, respectively.

2. The method of claim 1, wherein the characteristic feature of the frame is obtained from a frame signature created using the visual, audio or text properties of the frame.

3. The method of claim 1, wherein the characteristic feature of the frame is its frame number.

4. The method of claim 1, wherein the characteristic feature of the frame is its time stamp in the video.

5. The method of claim 1, wherein the information analyzed to detect changes is selected from the group consisting of DCT coefficients, color, edge, shape, silence, speech, music, close captioning, and audio content of the video, and combinations thereof.

6. The method of claim 1, wherein the segment is stored on the same medium as the video.

7. The method of claim 1, further comprising the step of:
   storing a predefined length of the video from the segment start point.

8. The method of claim 1, wherein the segment start point is determined as a predefined length of the video before the selected frame.

9. The method of claim 1, wherein the stored segment contains at least one of EPG data, a frame of the segment, or transcript information from the segment and combinations thereof.

10. A system for identifying segments of a video for later retrieval, comprising:
    a bookmarker component constructed to operate in connection with a video player that can display the content of a video that includes a series of video frames;
    the bookmarker being responsive to a signal to identify a selected frame of the video being displayed when the bookmark signal is received;
    the bookmarker also being constructed to:
      identify a characteristic feature of the selected frame and record information corresponding to said selected frame on a storage medium,
      process the video to define a segment of the video containing the selected frame by identifying segment starting point and segment endpoint boundaries, and to send at least a portion of the segment containing the selected frame to a storage medium,
    wherein the bookmarker includes an analysis engine constructed to detect changes of information in the audio, visual or transcript portion of the video with respect to the frame recorded information, in frames prior to and subsequent to the selected frame, respectively.

11. The system of claim 10, wherein the characteristic feature of the selected frame is obtained from a frame signature created using the visual, audio or text properties of the frame.

12. The system of claim 10, wherein the characteristic feature of the frame is its frame number and the bookmarker is constructed to determine the frame number.

13. The system of claim 10, wherein the characteristic feature of the frame is its time stamp in the video and the bookmarker constructed to determine the time stamp in the video.

14. The system of claim 10, wherein the analysis engine analyzes information selected from the group consisting of DCT coefficients, color, edge, shape, silence, speech, music, closed captioning and audio content of the video and combinations thereof.

15. The system of claim 10, wherein the bookmarker is constructed to record at least a portion of the segment on the same medium as the video.

16. The system of the claim 10, wherein the bookmarker is constructed to record a predefined length of the video from the segment start point.

17. A method of processing electronically stored content, comprising:
    electronically storing and displaying items of content, selected from the group consisting of videos, audio, images, text and combinations thereof and while displaying the content, in response to receipt of a bookmark signal, bookmarking a portion of the content item and storing information associated with the bookmarked content item, processing the content item to define a segment of the content item containing the portion by identifying segment starting point and segment endpoint boundaries and storing a selected segment of the content item having sufficient identifying information to identify the content item, then retaining on a storage device only the segment identifying the item and not the entire item, then at a later time, comparing the information identifying the item to identify that same item, wherein the starting point and endpoint of the segment are based on detecting changes of information in the audio, visual or transcript portion of the video with respect to the stored information associated with the selected content item, prior to and subsequent to the selected content item, respectively.

18. The method of claim 17, wherein the bookmarks are backed up into a remote device.

19. The method of claiming 17, wherein the bookmarks are categorized on the basis of at least one of EPG data, transcript information, captioning information or video feature information.

20. The method of claim 17, wherein the bookmarks are accessed by at least one of web pages, mobile communications devices via a wireless connection, PDAs, and computerized watches.

21. The method of claim 17, wherein the bookmarks are stored at multiple levels and different individuals have access to the different levels.

22. The method of claim 17, wherein the bookmark is created by storing it with a first storage device onto a storage medium and is then transferred to a storage medium associated with another device.

23. The method of claim 17, wherein the item of content is deleted from the medium on which it had been stored after the bookmark is created, while retaining the bookmark.

24. A method of identifying items of content, selected from the group consisting of videos, audio, images, text and combinations thereof, comprising the steps of:

receiving a bookmark signal to bookmark a portion of the content item; in response to the bookmark signal, storing information associated with the content and processing the content item to define a segment of the content item containing the portion by identifying segment starting point and segment endpoint boundaries wherein the starting point and endpoint of the segment are based on detecting changes of information in the audio, visual or transcript portion with respect to the recorded content information before and after the bookmarked portion of the content item;

creating a bookmark comprising the segment of the content item and retaining the segment identifying the item on a storage medium; and downloading the bookmarks to a user at a remote location at the request of the user, the user then using the bookmarks to identify the original item of the content from which the bookmark was created.

* * * * *